United States Patent [19]

Fuhrman

[11] Patent Number: 4,774,785
[45] Date of Patent: Oct. 4, 1988

[54] APPARATUS FOR CAPTURING BIRDS AND OTHER SMALL ANIMALS

[76] Inventor: Richard C. Fuhrman, 1212 W. Flamingo, Seabrook, Tex. 77586

[21] Appl. No.: 101,742
[22] Filed: Sep. 28, 1987
[51] Int. Cl.$^4$ .......................................... A01M 23/02
[52] U.S. Cl. ........................................................... 43/63
[58] Field of Search ................................ 43/63, 85, 60

[56] References Cited

U.S. PATENT DOCUMENTS

| | | | |
|---|---|---|---|
| 507,086 | 10/1893 | Buntain | 43/63 |
| 966,213 | 8/1910 | Jauregin | 43/63 |
| 1,075,954 | 9/1913 | Verner | 43/63 |
| 1,576,707 | 3/1926 | Barley | 43/63 |
| 2,093,719 | 9/1937 | Furukawa | 43/85 |
| 3,596,395 | 8/1971 | Clement | 43/63 |

Primary Examiner—Nicholas P. Godici
Assistant Examiner—Karen Skillman
Attorney, Agent, or Firm—Bill B. Berryhill

[57] ABSTRACT

Apparatus for capturing birds and other small animals which may include: an elongated support member; a pair of flexible rod members bent into loops and the ends of which are attached to the support member forming a pair of hoops for supporting a pair of sock type nets. The hoops are normally in positions in which the net openings interset to form an enclosure for capturing of birds and other small animals. The distal edges of the hoops may be forced, through opposing arcs, from normal positions to set positions, in which the distal edges are displaced less than one hundred eighty degrees for engagement with a release assembly. The release assembly is remotely operable to release the hoops for self imposed return to the normal positions.

5 Claims, 2 Drawing Sheets

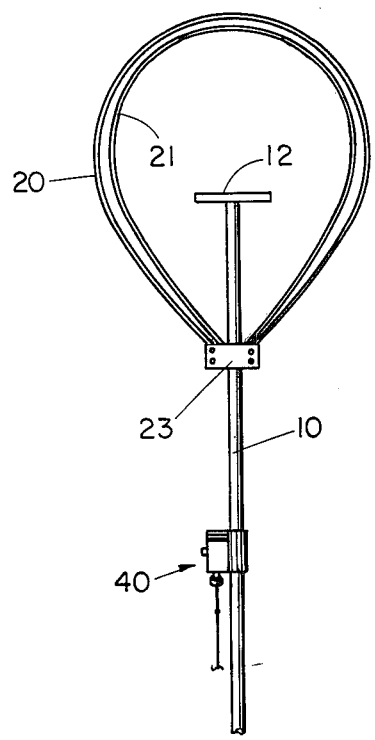
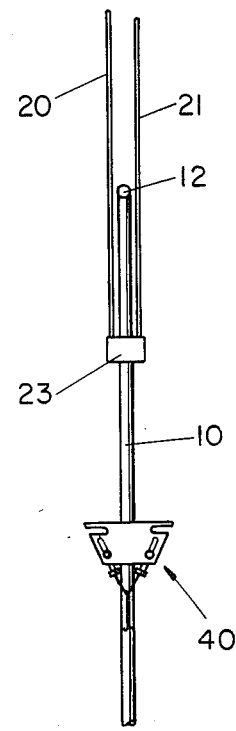
FIG. 1
FIG. 2
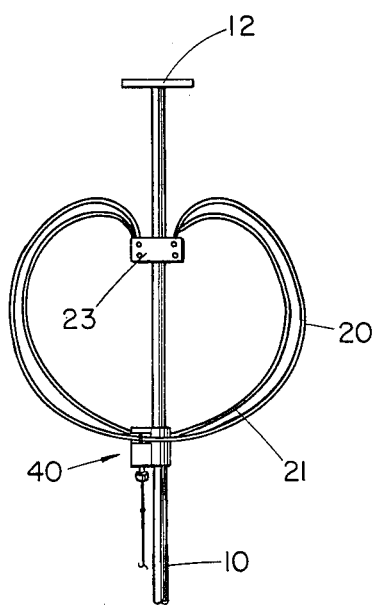
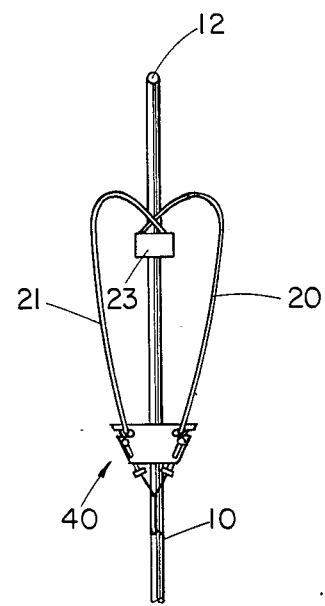
FIG. 3
FIG. 4

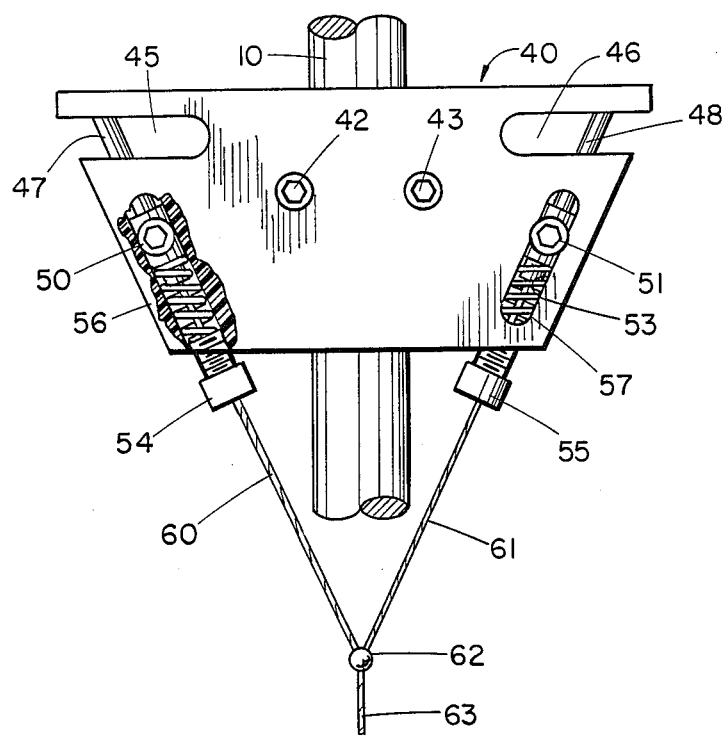
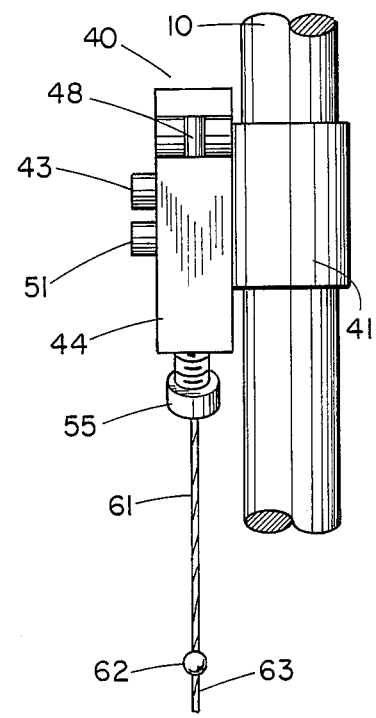
FIG. 5  FIG. 6
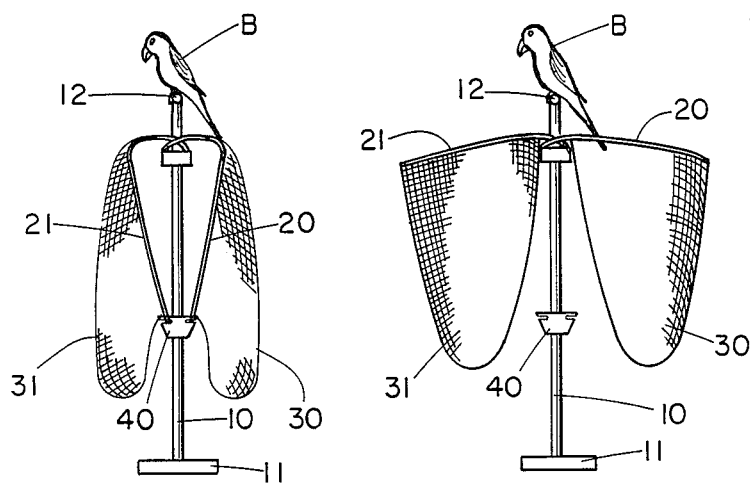
FIG. 7  FIG. 8  FIG. 9

APPARATUS FOR CAPTURING BIRDS AND OTHER SMALL ANIMALS

BACKGROUND OF THE INVENTION

1. Field of the Invention

The present invention pertains to apparatus for capturing birds and other small animals. In particular, the present invention pertains to apparatus especially useful in aerial capture of animals, primarily birds.

2. Description of the Prior Art

Many devices have been developed for the capture of large and small animals. One of the problems associated with the capture of small animals, particularly birds, is the potential physical harm which may occur to the animal by the capturing device. Another problem is the fact that animals are usually very wary of trap devices and must become accustomed to them before they can be captured.

Some examples of small animal traps are shown in U.S. Pat. Nos. 507,086; 966,213; 1,075,954; 1,576,707 and 3,596,395. Most of these traps involve some sort of hinged and spring biased mechanism by which a net is propelled against the ground or against another net to capture the animal therein. A rather unique bird trap is shown in U.S. Pat. No. 2,093,719 in which forked members are released for movement around the legs and feet of a bird. Most of these devices are not suitable for the aerial capture of birds. Even though U.S. Pat. No. 2,093,19 is designed for such purpose, it appears that this device may be physically harmful and not very efficient. Thus, the search continues for apparatus particularly suitable for aerial capture of birds.

SUMMARY OF THE PRESENT INVENTION

In the present invention, apparatus is disclosed for capturing small animals, particularly for aerial capture of birds. The apparatus comprises an elongated support member and a pair of flexible rod members each one of which is bent into a loop so that the ends thereof are brought closely together for attachment to the support member forming first and second hoops for supporting the generally circular opening of first and second sock type nets. The first and second hoops are normally in a position in which the first and second net openings are slightly interset so that the first and second nets form an enclosure. The distal edges of the hoops may be forced, through opposing arcs, from normal positions to set positions, in which the distal edges are displaced slightly less than one hundred eighty degrees from the normal position. In the set position, the distal edges of each hoop engages a release assembly carried by the elongated support member. The release assembly is remotely operable to release the hoops for self imposed return to the normal position. It is during this movement that a bird or animal is captured.

Thus, the capturing apparatus of the present invention is particularly useful in the aerial capture of birds. Its unique construction allows the apparatus to be set so that the bird or animal is not frightened or wary of the device. When released, the apparatus quickly encloses the bird, or other animal, in a netted enclosure with minimal chance of harm. It is easily activated from a remote position. The capture apparatus is relatively simple in operation and manufacture. Its operation is extremely efficient. Many other objects and advantages of the invention will be seen after reading the description which follows in conjunction with the accompanying drawings.

BRIEF DESCRIPTION OF THE DRAWINGS

FIG. 1 is a front elevation view of apparatus for capturing birds and other small animals, in the normal or capture position, according to a preferred embodiment of the invention;

FIG. 2 is a side elevation view of the capturing apparatus of FIG. 1 in the normal or capture position;

FIG. 3 is a front elevation view of the capturing apparatus of FIGS. 1 and 2 but showing the apparatus in its set position;

FIG. 4 is a side elevation view of the apparatus of FIG. 3 in the set position;

FIG. 5 is a front view of a release assembly utilized with the capturing apparatus of FIGS. 1-4, according to a preferred embodiment thereof;

FIG. 6 is a side elevation view of the release apparatus of FIG. 5; and

FIGS. 7, 8, 9 are sequenced elevation views of the capturing apparatus of the present invention, illustrating the apparatus in its set, released and capture positions, respectively.

DESCRIPTION OF A PREFERRED EMBODIMENT

Referring first to FIGS. 1 and 2, there is shown apparatus for capturing birds and other small animals according to a preferred embodiment of the invention. The apparatus comprises an elongated support member 10 which may be supported on the ground or any other support surface by suitable means. As illustrated in FIGS. 7, 8 and 9, the support member 10 is attached to a base 11. Attached to the upper end of the support member 10 is a perch or platform 12 on which a bird or other small animal may be supported. The perch 12 may be constructed in a number of ways. For example, it may be designed to carry food which would be attractive to the bird or animal being captured.

A pair of flexible rod members 20 and 21 are bent into loops so that the ends thereof are brought closely together for attachment to a mounting block 23 which is in turn fastened to the support member 10. The rod members 20 and 21 are preferrably of strong but flexible material such as fiberglass, especially pulltruded fiberglass. It is important that the ends of the rod members 20 and 21 are fastened to the mounting rack 23 so that the rods are firmly affixed in a nonrotating fashion.

Each of the rods 20 and 21, so bent, form first and second hoops for supporting the generally circular opening of first and second sock type nets 30, 31 (not shown in FIGS. 1-4 but see FIGS. 7, 8 and 9). The rods or hoops 20, 21 are normally in positions of FIGS. 1, 2 and 9 in which the net openings are slightly interset so that the first and second nets 30, 31 form an enclosure for capturing of birds and other small animals (see FIG. 9).

Attached to the support member 10 below the mounting bracket 23 is a release assembly 40. Construction of the release assembly 40 is shown in greater detail in FIGS. 5 and 6. The release assembly 40 includes a collar member 41 which is fixedly attached to the support member 10 in any suitable manner. Attached to the collar member 41 by screws 42 and 43 is a carrier frame or bracket 44, the edges of which are provided with recesses or slots 45 or 46. Slidingly mounted in holes provided therefor are a pair of pin members 47, 48 which are movable between extended positions (as shown in FIGS. 5 and 6), in which the pin members 47, 48 extend across the recesses 45 and 46, and retracted positions (not shown) in which the pins 47, 48 do not extend into the recesses 45 and 46. Engaging an enlarged portion of the pin members 47 and 48 are set screws 50 and 51 the heads of which project upwardly for sliding movement within slots (see 53 in FIG. 5) which communicate with the cylindrical holes provided for pins 47 and 48. Threaded bushings 54 and 55 engage threads in the pin holes. Springs 56 and 57 are mounted between the bushings 54, 55 and the enlarged heads of the pins 47 and 48 biasing the pins 47, 48 toward the extended positions of FIGS. 5 and 6.

The bushings 54, 55 are centrally bored to provide small holes through which cables 60 and 61 extend for engagement with corresponding holes provided in the enlarged ends of the pins 47 and 48. The set screws 50 and 51 and other set screws, if necessary, engage the cables 60 and 61 to affix the ends thereof to the pins 47 and 48. The cables 60 and 61 are preferrably joined as at 62 to become a single cable 63 which may extend to any remote location by which a force may be applied thereto. It can be easily understood that upon the application of sufficient force, the bias of springs 56 and 57 may be overcome and the pins 47 and 48 moved to retracted positions in which the recesses 45 and 46 are no longer engaged thereby.

Referring now also to FIGS. 3 and 4, it is seen that the distal edges of the first and second hoops 20, 21 may be forced through opposing arcs from the normal positions of FIGS. 1 and 2 to set positions (FIGS. 3 and 4) in which the distal edges of the hoops 20, 21 are displaced less than one hundred and eighty degrees (180°) from normal positions for engagement with the release assembly 40. Actually the displacement is somewhat less than a hundred and eighty degrees, e.g., one hundred seventy degrees. Upon forcing of the hoops 20, 21 to the set positions of FIGS. 3 and 4, the pins 47, 48 (FIGS. 5 and 6) are retracted by a force applied to the cable 63 so that a midportion of the hoops 20, 21 are received by the recesses 45 and 46. The pins 47 and 48 are then allowed to return to the extended position of FIGS. 5 and 6 holding the hoops 20 and 21 in the set positions of FIGS. 3, 4. In the set positions, the fibers of rods 20 and 21 are placed in tension, compression and torsion so that a tremendous amount of potential energy is stored therein. Upon release of the hoops 20 and 21 by operation of the release assembly 40, the hoops 20, 21 will be quickly compelled by self imposed forces to return to the normal positions of FIGS. 1 and 2.

The operation of the capturing apparatus of the present invention is best understood with reference to the sequenced drawings 7, 8 and 9. FIG. 7 illustrates set positions in which the distal edges of the hoops 20 and 21 have been displaced for engagement by the release assemoly 40. This position will be maintained until a bird B or other animal rests on the perch 12. The pins 47, 48 (see FIG. 5) of the release assembly 40 are then retracted by applying a force to cable 63 allowing the distal edges of hoops 20 and 21 to escape the recesses 45 and 46. The potential energy stored in the hoops 20 and 21 is thus released allowing the hoops 20 and 21 to return toward the normal positions. As this occurs, the nets 30 and 31 attached thereto are brought upward in an arc (as illustrated in FIG. 8) until they reach the normal positon of FIG. 9. In this position, the nets 30 and 31 form an enclosure in which the bird B is entrapped therein.

The release of the hoops 20 and 21 and the nets 30, 31 attached thereto from a remote location and at a quick speed allows the bird B to be captured before it can attempt to escape. There is little if any potential harm to the bird B since the only contact anticipated is with the soft nets 30 and 31. The apparatus is extremely efficient and effective for capturing wild birds and animals.

A single embodiment of the invention has been described herein. However, many variations may be made without departing from the spirit of the invention. Accordingly, it is intended that the scope of the invention be limited only by the claims which follow.

I claim:

1. Apparatus for capturing birds and other small animals comprising:

an elongated support member;

a flexible rod member bent into a loop so that the ends thereof are brought closely together and fixedly attached to said support member in non-rotating fashion forming a first hoop for supporting the generally circular opening of a first sock type net; and another flexible rod member bent into a loop so that the ends thereof are brought closely together and fixedly attached to said support member in non-rotating fashion forming a second hoop for supporting the generally circular opening of a second sock type net;

said first and second hoops normally being in positions in which said first and second net openings are mutually interest so that said first and second nets form an enclosure for said capturing of said birds and other small animals but the distal edges of said first and second hoops being forceable through opposing arcs, from said normal positions to set positions, in which said distal edges are displaced less than one hundred and eighty degrees from said normal positions for engagement with release means carried by said elongated support member, said release means being remotely operable to release said hoops for self imposed return to said normal positions.

2. The capturing apparatus of claim 1 in which said rod members are made of fiberglass.

3. The capturing apparatus of claim 1 in which said release means comprises a carrier means attached to said support member having first and second recesses therein for receiving a mid-portion of said first and second rod members, respectively, when said hoops are in said set positions, first and second pin members extending across said first and second recesses to hold said hoops in said set positions, said pin members being retractable to release said hoops for said return to said normal positions.

4. The capturing apparatus of claim 3 including cable means attached to said pin members and remotely operable to force said pin members to said retractable positions.

5. The capturing apparatus of claim 4 in which said release means includes first and second biasing means biasing said first and second pin members toward said extending positions.

* * * * *